United States Patent
Elrefaie et al.

(10) Patent No.: US 6,243,577 B1
(45) Date of Patent: Jun. 5, 2001

(54) FREQUENCY TRANSLATION TO LOCAL MULTI-POINT DISTRIBUTION SYSTEM FOR PERSONAL COMMUNICATIONS SERVICES

(75) Inventors: Aly F. Elrefaie, Cupertino; Hans George Mattes, Santa Rosa, both of CA (US)

(73) Assignee: Hewlett-Packard Corporation, Palo Alto, CA (US)

( * ) Notice: Subject to any disclaimer, the term of this patent is extended or adjusted under 35 U.S.C. 154(b) by 0 days.

(21) Appl. No.: 08/912,912

(22) Filed: Aug. 15, 1997

(51) Int. Cl.$^7$ ............................... H04Q 7/20; H04B 7/14
(52) U.S. Cl. ........................ 455/426; 455/15; 455/445
(58) Field of Search ............................ 455/426, 552, 455/553, 522, 523, 76, 857, 87, 42, 422, 403, 11.1, 15, 17, 20, 22

(56) References Cited

U.S. PATENT DOCUMENTS

| | | | |
|---|---|---|---|
| 5,081,703 | * | 1/1992 | Lee ........................................... 455/15 |
| 5,303,287 | * | 4/1994 | Laborde ................................. 455/426 |
| 5,406,615 | * | 4/1995 | Miller, II et al. ..................... 455/552 |
| 5,604,789 | * | 2/1997 | Lerman ................................. 455/454 |
| 5,734,982 | * | 3/1998 | Endo et al. ........................... 455/450 |
| 5,812,951 | * | 9/1998 | Ganesan et al. ...................... 455/445 |
| 6,047,177 | * | 4/2000 | Wickman ............................. 455/426 |

FOREIGN PATENT DOCUMENTS

| | | | |
|---|---|---|---|
| 0 468 688 A2 | * | 1/1992 | (EP) . |
| 0786876A2 | | 7/1997 | (EP) . |

* cited by examiner

Primary Examiner—Tracy Legree

(57) ABSTRACT

A first embodiment of the present invention discloses a system for extending the range of Personal Communication Services ("PCS") band wireless local loop services. A frequency translation unit at both the user's residence and at the central hub translates the PCS signal from the PCS frequency band to the Local Multipoint Distribution System ("LMDS") band and back. As LMDS has a significant range advantage over DECT and PHS without greatly increased costs, this frequency translation allows DECT and PHS telephones to be used over greater ranges, without the necessity of constructing a large number of cellular transceiver sites. A second embodiment of the present invention uses a frequency translation unit to permit the use of either PCS or known cellular telephones inside a user's residence without the call being routed through the more expensive cellular network. The frequency translation unit translates from PCS or cellular frequencies to LMDS frequencies. The user's calls are then completed over the less expensive LMDS network. When outside the user's residence, the PCS or cellular telephone operates in its original known fashion.

9 Claims, 3 Drawing Sheets

FREQUENCY TRANSLATION TO LOCAL MULTI-POINT DISTRIBUTION SYSTEM FOR PERSONAL COMMUNICATIONS SERVICES

BACKGROUND OF THE INVENTION

Low cost Personal Communication Services ("PCS"), which typically include wireless telephone service, paging, and digital data transmission, can succeed commercially only if several conflicting requirements are properly balanced. Among these requirements are low handset cost, low transmission power to extend battery life and permit a lighter handset, good speech quality, and high user density.

At least two forms of PCS are currently available. The first form, Digital European Cordless Telecommunications ("DECT") standard wireless telephones operate at 1880–1900 MHZ. A U.S. version of DECT, operating at 900 MHZ (ISM band) also exists, and a second U.S. version of DECT operating at 1900 MHZ, called Personal Access Communication Systems ("PACS") will be available in early 1997. In Japan, a second form of PCS with similar characteristics to DECT is available and is called the Personal Handyphone System ("PHS"). The technical parameters and capacities of these systems are known.

SUMMARY OF THE INVENTION

Broadband wireless access systems operating at millimeter wavelengths including Local Multipoint Distribution Systems ("LMDS") operating at 28 Ghz and other point-to-multiple-point systems such as Digital Electronic Messaging Systems ("DEMS") at 24 Ghz can be used to extend the range of PCS systems including DECT, PACS, and PHS as well as providing other operational advantages. LMDS resembles in some respects cellular telephone networks. Each home using LMDS is equipped with a Customer Premises Equipment ("CPE") unit comprising a narrow beam antenna/millimeter transceiver unit on or at the roof line. Inside the home, a general purpose modem or similar gateway connects the antenna/transceiver unit to various home information appliances, including but not limited to telephones, televisions, and computers. The home antenna/transceiver units in turn communicate with sector hubs, each hub having an antenna, the height of which will vary from 15–25 meters, depending on desired range, local terrain, and local zoning and building restrictions. Each hub is in turn connected to a central office, which may act as a content provider, an interface to the telephone system, or an interface to the Internet.

In a first embodiment of the present invention, each user will have a home gateway that includes an interface to the DECT's or PHS's Fixed Access Unit ("FAU"). The FAU provides the user with a standard telephone socket for connecting conventional analog equipment such as telephones, facsimile machines, modems, and possibly Integrated Service Digital Network ("ISDN") equipment. The home gateway interface to the PCS FAU provides frequency translation from the DECT/PHS system to the LMDS system. The home gateway will be connected to a CPE unit at roof level. At the hub, the telephony signal will be received from the LMDS system and connected to a DECT/PHS base station through an interface that provides the necessary frequency translation.

In a second embodiment of the present invention, LMDS is used to provide a cost-effective home use option for users of known cellular telephones and PCS users. In this embodiment, when cellular telephone or PCS users are outside their homes, their handsets transmit and receive signals to and from the host cellular/PCS site. Operation is conventional and known in this second embodiment when the user is outside the home environment. Inside a house, the PCS or cellular telephone no longer sends and receives signals to and from the host cellular/PCS site. Instead, a special channel is used which is dedicated to indoor use and a picocell unit transmits and receives signals from the PCS or cellular telephone user and translates the signals up to or down from the LMDS frequency range. In turn, the picocell unit communicates with an LMDS cell. The LMDS cell is coupled to a cellular or PCS cell site, which in turn can be coupled to a mobile telephone switching office.

These embodiments of the present invention will now be described in detail, with reference to the figures listed and described below.

DETAILED DESCRIPTION OF THE INVENTION

Cellular telephone systems are known. Typically, the cell size is a circle with a radius of 5 km, which in turn requires a tall antenna. Given the relatively large cell size, individual handsets are typically relatively powerful (approximately 1 W into the handset's antenna). Often, the battery life of these handsets is fairly limited. Although digital cellular telephones have improved voice quality over analog cellular telephones, neither digital nor analog cellular telephones are considered to be of "wire line" quality.

DECT/PHS systems offer nearly wire line voice quality but only at very short ranges, typically 50–150 meters. Given the short transmission distance, the handsets are usually considerably less expensive than those used in cellular telephone networks and the battery life is also typically longer. DECT/PHS and similar technologies have been incorporated into various cordless telephone systems. One standard for such systems is DECT which is available in Europe, operating at 1880–1900 MHZ, and in the U.S., operating at 905–910 MHZ. Both DECT systems are time division, multiple access ("TDMA")/time division duplex ("TDD") multicarrier and provide multiple slots for users within range of the basestations. In Europe, 12 slots are allocated per frame, and in the U.S., 8 slots are allocated per frame. The PHS in Japan is a TDD system.

DECT products are already in wide use in Europe and Asia and are becoming increasingly available in the U.S. Both embodiments of the present invention can be readily adapted to operate with any DECT product or any other PCS system.

To provide wireless local loop service using DECT/PHS over LMDS, each user will have a home gateway that includes a frequency translation interface to the DECT/PHS Fixed Access Unit ("FAU"). The DECT/PHS FAU provides users with a standard telephone socket for connecting conventional analog equipment such as telephones, facsimile machines, modems, and possibly ISDN equipment. The DECT/PHS FAU will be modified by replacing the antenna unit with a shielded coaxial cable. The translation from the particular DECT/PHS FAU frequency band to the LMDS band is achieved using a simple frequency translation interface. The use of the simple frequency translation interface allows LMDS service providers and other broadband wireless distribution systems to carry such PCS technologies as DECT, PHS, or PACS over their systems anywhere in the world.

At the hub end, the telephony signal will be received over LMDS, with a cell size of up to 2 km radius, and connected to a modified PCS radio port, with no antenna, through a simple frequency interface similar to the one used by the users. The PCS radio port can be connected to the radio port control units located at the central office using known transmission techniques, including copper wire, radio links, or fiber optic lines.

Figure 1:
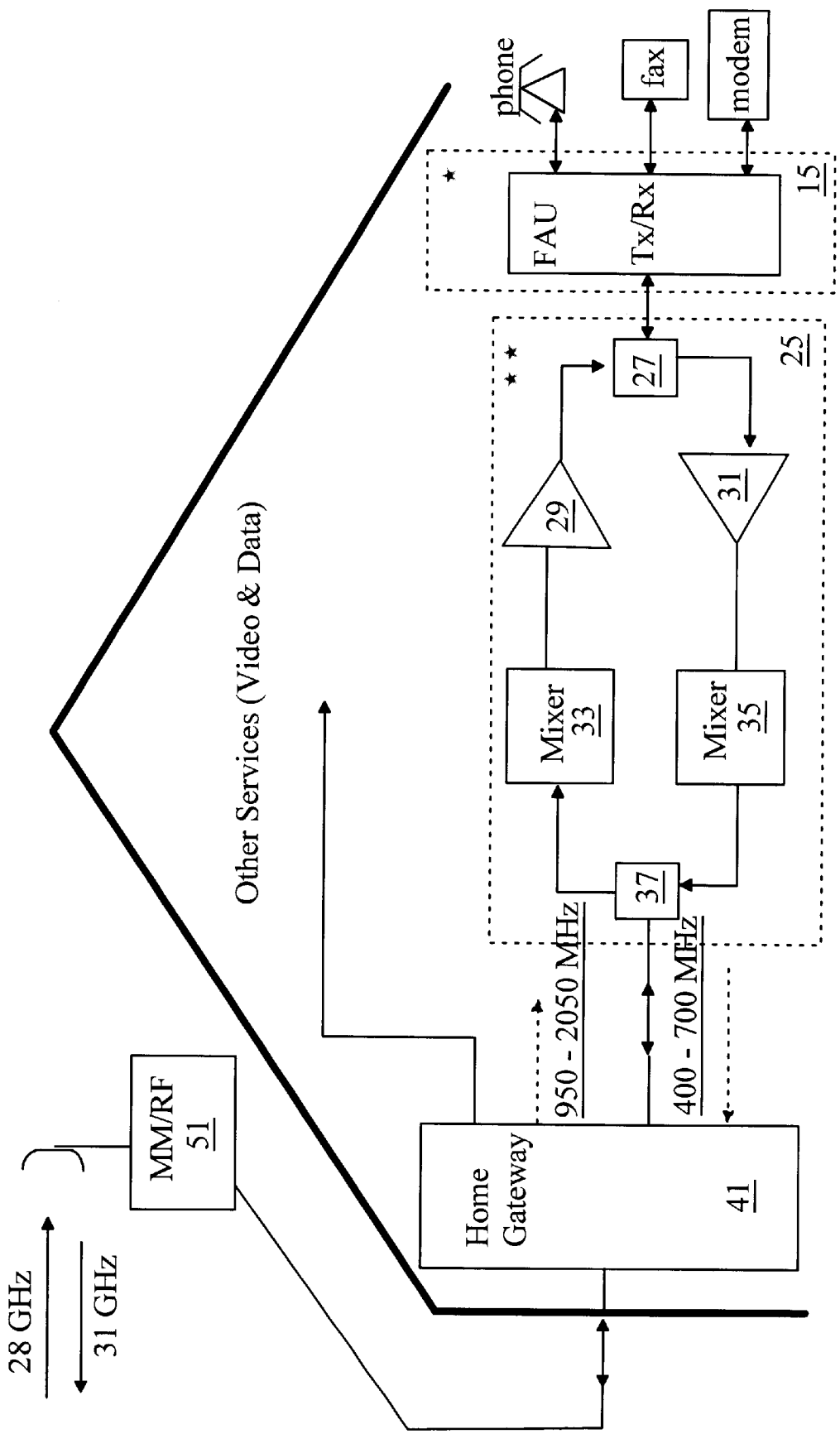
FIG. 1 is a block diagram of the user's side of a first embodiment of the present invention.
Figure 2:
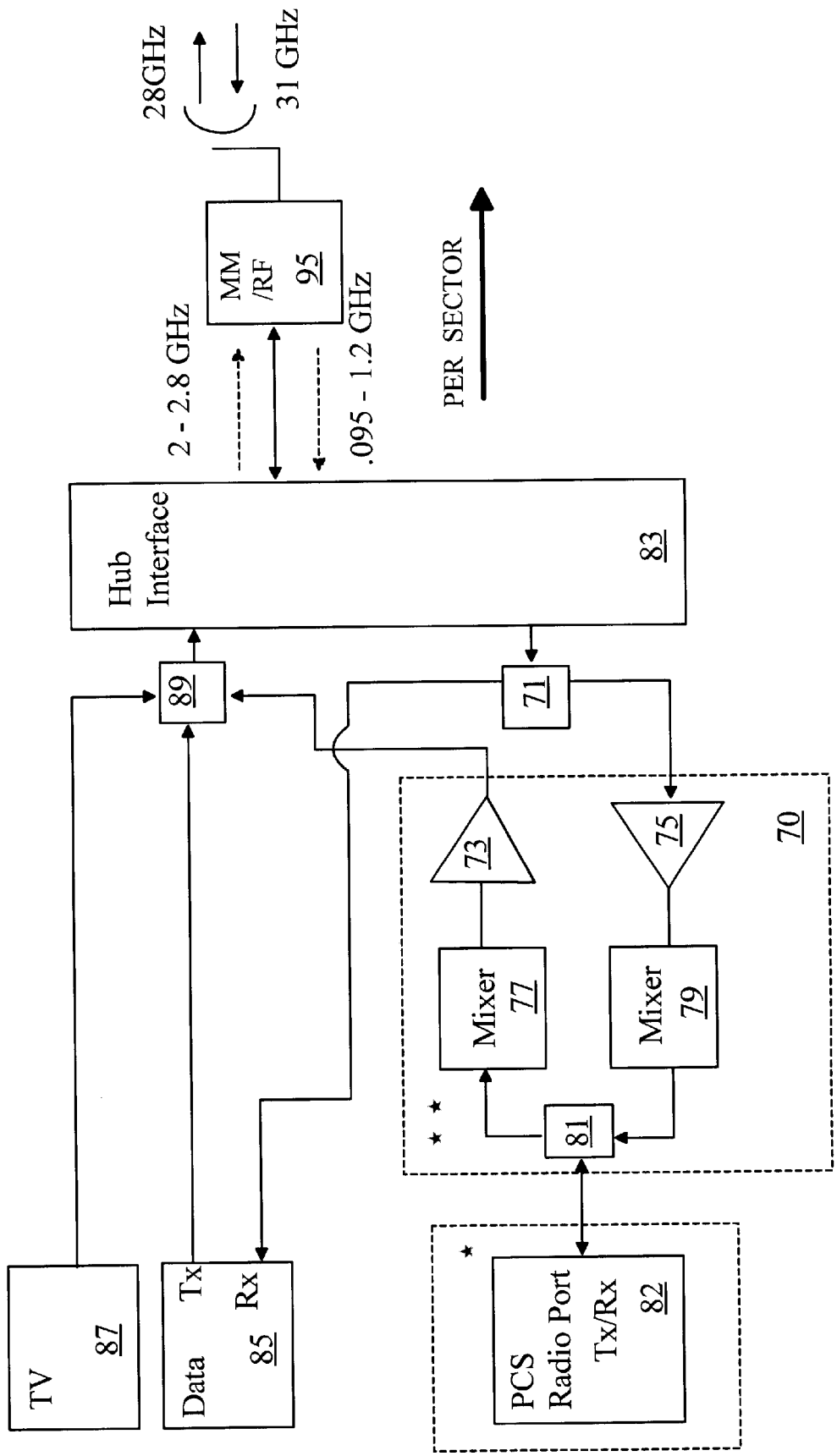
FIG. 2 is a block diagram of the hub side of the first embodiment of the present invention.

First Embodiment of the Invention: FIGS. 1 and 2

FIG. 1 is a block diagram of the user's side of a first embodiment of the present invention. An original DECT fixed access unit ("FAU") 15 is coupled to the user's telephone, fax, and modem. A frequency translation unit ("FTU") 25 is coupled to the FAU 15. The FTU 25 is further comprised of a power splitter 27, first and second amplifiers 29 and 31, first and second mixers 33 and 35, and a second power splitter 37. The FTU 25 steps up outgoing traffic from DECT/PHS frequency to LMDS frequency, and steps down incoming traffic from LMDS frequencies to DECT/PHS frequency.

The FTU 25 is in turn coupled to a home gateway unit 41. The home gateway unit 41 contains a splitter which separates in-coming video and other high data rate signals from telephone and other low rate signals, and directs the telephone and low data rate signals into the FTU 25. A power supply also resides within the home gateway unit 41 and the home gateway unit 41 is in turn coupled to the CPE, including an MM/RF transmitter unit 51, which comprises at least a transceiver operating at the LMDS frequency band.

FIG. 2 is a block diagram of the hub equipment used in this first embodiment of the present invention. A hub FTU 70 comprises a first power splitter 71, first and second amplifiers 73 and 75, first and second mixers 77 and 79, a and second power splitter 81. The hub FTU 70 is coupled through the second power splitter 81 to a bi-directional PCS radio port 82. Through the first power splitter 71, the hub FTU 70 is coupled to a hub interface 83 and to a data transceiver 85. The data transceiver 85 and a TV transmitter 87 are coupled through a power splitter 89 to a hub interface 83. The hub interface 83 is in turn coupled to an MM/RF transceiver 95.

This first embodiment of the present invention offers the possibility of significantly reducing infrastructure cost and increasing the system's range from 150 m to 2 km by using only one tall antenna at a hub to distribute telephone, video, and high speed data services in the LMDS band to users located within a 2 km radius by one service provider instead of using several other antenna towers in the same area for wireless local loop services only at the PCS band. The relatively simple and inexpensive frequency translation interface proposed in this first embodiment allows LMDS or any broadband wireless system service provider at millimeter wavelengths to use PCS technologies such as DECT, PHS, or PACS in any part of the world with minimum modification.

This first embodiment of the present invention has been described using DECT/PHS systems over LMDS and has been tested with both U.S. and European DECT systems. In a similar fashion, other embodiments of the present invention could be adapted for use with other low tier PCS and cordless systems, such as the Japanese PHS and the U.S. PACS, if the service providers so desire.

Figure 3:
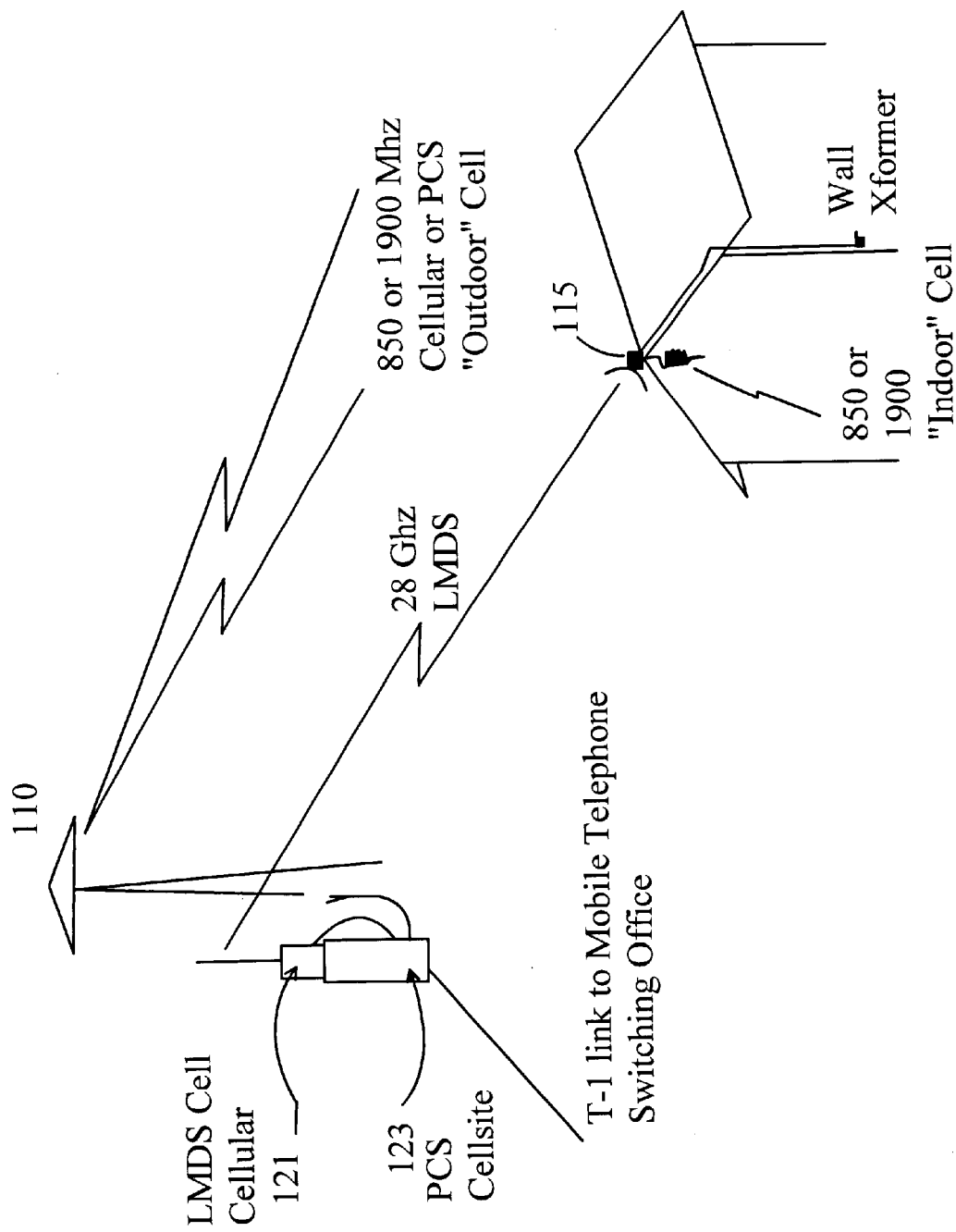
FIG. 3 is a diagram illustrating a second embodiment of the present invention.

Second Embodiment of the Invention: FIG. 3

In a second embodiment of the present invention, LMDS is used to provide a cost-effective home use option for users of known cellular telephones and PCS users. As shown in FIG. 3, when cellular telephone or PCS users are outside, their handsets transmit and receive signals to and from cellular tower 110. While the user is in an outside environment, operation of the cellular and PCS telephones is conventional and known.

Once inside a house 117, however, the PCS or cellular telephone no longer sends and receives signals to and from the cellular tower 110. Instead, a picocell unit 115 transmits and receives signal from the PCS or cellular telephone users, translating them up to or down from the LMDS frequency range. In turn, the picocell unit 115 communicates with an LMDS cell 121, which serves as a transmitter. It is readily foreseeable that the LMDS cell 121 and a cellular or PCS system cell 123 would be co-located. The LMDS cell 121 is coupled to the cellular or PCS cell 123, which is in turn coupled by a T-1 link to a mobile telephone switching office.

In this second embodiment, a portion of the LMDS' bandwidth in the 28 GHz band is used to extend the range of installed cellular or PCS base stations to very low power on-premises/in-premises re-radiators, such as the picocell unit 115 shown in FIG. 3. Between 1.5 MHZ and 30 MHZ of the LMDS bandwidth is used for this purpose.

When the user is inside a house, the cellular/PCS handset communicates with the picocell unit 115 at cellular or PCS frequencies. As the user moves outdoors, the service is provided directly between the user and a host cellular/PCS cell site in a known manner. The link between the cellular/PCS system and the picocell unit 115 is implemented by co-locating the LMDS host cell 121 with each cellular/PCS cell site. This host cell 121 will use some of the 28 GHz band to transport up-converted cellular/PCS signals to the premises-located picocell units, which will in turn down-convert the signals back to the appropriate cellular/PCS band and re-radiate at very low power. The mirror image of this process provides the reverse channel capability.

Additional LMDS band re-radiator host cells may be necessary to assure coverage at 28 GHz, where propagation is generally more limited and typical cellular/PCS cell spacings may not provide adequate coverage. In the cellular regime, a separate, perhaps properly called "virtual" cellular/PCS cell site can be defined as a PN offset for CDMA or a dedicated RF channel for GSM/TDMA for in-premises use. This allows the cellular/PCS operator to distinguish between in-premises use and outdoor use so that different billing rates can be used for these different usages.

As in traditional microcells, either fiber connected or microwave connected, the LMDS signal now transports the fully modulated cellular/PCS bandwidth, and the picocell unit 115 does not perform any modulation or demodulation function. The downlink functions performed at the picocell unit 115 are reception and filtering in the LMDS band, down conversion from LMDS frequencies (28 Ghz) to cellular or PCS frequencies (850 MHZ/1.9 Ghz), and re-radiation in the cellular or PCS band. In the uplink direction, the picocell unit 115 performs the functions of LNA for cellular or PCS, upconversion to LMDS, combining with any other usage of the LMDS spectrum in the uplink, and propagation of the combined LMDS signal back to the LMDS host cell. All portions of this second embodiment use digital modulation, which is somewhat more fraud resistant than analog cellular.

This second embodiment allows wireless in-premises access to compete with wireline telephony prices while supporting full mobile telephony, at market-driven mobile telephony prices outside the premises. It simultaneously supports the "one-number access" that personal communications concepts envision. By linking the user to in-premises wireline-alternative service and still allowing cellular/PCS service, it should encourage co-ordinated long distance service.

What is claimed is:

1. In a wireless telephone network operating at a first frequency band, the network having a plurality of user wireless handsets and network transceiver hubs, a system for extending the range of the transceiver hubs and the handsets, the system comprising:

a hub frequency translation unit, for receiving incoming telephone signals transmitted from a user at a first predetermined frequency, for translating the incoming telephone signals to a second predetermined frequency, for receiving outgoing telephone signals at the second predetermined frequency, for translating the outgoing telephone signals to the first predetermined frequency, and for transmitting the outgoing telephone signals to be received by a user as incoming telephone signals; and a user frequency translation unit, for receiving the translated incoming telephone signals at the second predetermined frequency transmitted by the hub frequency translation unit, for translating those incoming telephone signals to the first predetermined frequency and coupling those translated incoming telephone signals to one of the transceiver hubs, for receiving outgoing telephone signals at the first predetermined frequency from that transceiver hub, for translating the outgoing telephone signals from the first predetermined frequency to the second predetermined frequency, and for transmitting those outgoing telephone signals to be received as the outgoing telephone signals received by the hub frequency translation unit.

2. In a Personal Communication Service telephony system having user equipment, a plurality of hubs, and a central office, a range extending system comprised of:

a plurality of access units coupled to the Personal Communication Service user equipment of a plurality of users for translating signals from the user equipment operating at an operating frequency of the Personal Communication Service telephony system to a second predetermined operating frequency and back;

a plurality of transceiver units for transmitting and receiving signals at the second predetermined frequency coupled to the access units;

a plurality of translating hubs for receiving signals at the second predetermined operating frequency, for translating the signals to the operating frequency of the Personal Communication Service telephony system, for providing the translated signals to the Personal Communication Service telephony system, for receiving signals from the Personal Communication Service telephony system at the operating frequency of the Personal Communication Service, for translating the received signals to the second predetermined operating frequency, and for transmitting the translated signals to the transceiver units.

3. The range extending system of claim 2 wherein the operating frequency of the Personal Communication System is between 800 and 2000 MHZ and the second predetermined operating frequency is between 24 and 28 Ghz.

4. A system as recited in claim 2, wherein the second predetermined frequency is a Local Multipoint Distribution Systems (LDMS) frequency.

5. In a cellular telephone system, a system for utilizing a second wireless telephone system to reduce telephony costs, said second wireless telephone system communicating with hand-held transceivers in said second wireless telephone system utilizing signals in a predetermined frequency band, the system comprising:

a residential frequency translation unit for receiving and transmitting to at least a first cell of the second wireless telephone system at a predetermined second wireless system operating frequency and for receiving and transmitting at a first wireless system operating frequency to a cellular telephone hand-held transceiver, the frequency translation unit translating telephony signals to and from the first and second wireless system operating frequencies, the second wireless operating frequency being outside said predetermined frequency band said second wireless system, said first cell also transmitting signals to said hand-held transceivers in said predetermined frequency band.

6. A system as recited in claim 5, wherein the first wireless system frequency is a Personal Communication Services (PCS) frequency.

7. A system as recited in claim 5, wherein said second wireless system frequency is a Local Multipoint Distribution System (LDMS) frequency.

8. In a wireless telephone network operating at a first frequency band, the network having a plurality of user wireless handsets and network transceiver hubs, a system for extending the range of the transceiver hubs and the handsets, the system comprising:

a hub frequency translation unit, for receiving incoming telephone signals transmitted from a user at a first predetermined frequency, for translating the incoming telephone signals to a second predetermined frequency for receiving outgoing telephone signals at the second predetermined frequency, for translating the outgoing telephone signals to the first predetermined frequency, and for transmitting the outgoing telephone signals to be received by a user as incoming telephone signals; and a user frequency translation unit, for receiving the translated incoming telephone signals at the second predetermined frequency transmitted by the hub frequency translation unit, for translating those incoming telephone signals to the first predetermined frequency and coupling those translated incoming telephone signals to one of the transceiver hubs, for receiving outgoing telephone signals at the first predetermined frequency from that transceiver hubs, for translating the outgoing telephone signals from the first predetermined frequency to the second predetermined frequency, and for transmitting those outgoing telephone signals to be received as the outgoing telephone signals received by the hub frequency translation unit, wherein the first predetermined frequency is a Local Multipoint Distribution Systems (LMDS) frequency.

9. In a wireless telephone network operating at a first frequency band, the network having a plurality of user wireless handsets and network transceiver hubs, a system for extending the range of the transceiver hubs and the handsets, the system comprising:

a hub frequency translation unit, for receiving incoming telephone signals transmitted from a user at a first predetermined frequency, for translating the incoming telephone signals to a second predetermined frequency, for receiving outgoing telephone signals at the second predetermined frequency, for translating the outgoing telephone signals to the first predetermined frequency, and for transmitting the outgoing telephone signals to be received by a user as incoming telephone signals; and a user frequency translation unit, for receiving the translated incoming telephone signals at the second predetermined frequency transmitted by the hub frequency translation unit, for translating those incoming telephone signals to the first predetermined frequency and coupling those translated incoming telephone signals to one of the transceiver hubs, for receiving outgoing telephone signals at the first predetermined frequency from that transceiver hubs, for translating the outgoing telephone signals from the first predetermined frequency to the second predetermined frequency, and for transmitting those outgoing telephone signals to be received as the outgoing telephone signals received by the hub frequency translation unit, wherein the second predetermined frequency is a Personal Communication Services (PCS) frequency.

* * * * *